(12) United States Patent
Chen et al.

(10) Patent No.: US 6,215,815 B1
(45) Date of Patent: Apr. 10, 2001

(54) BAND INSERTION AND PRECANCELLATION TECHNIQUE FOR SIMULTANEOUS COMMUNICATIONS OF ANALOG FREQUENCY-MODULATED AND DIGITALLY MODULATED SIGNALS

(75) Inventors: Brian Chen, Somerville, MA (US); Carl-Erik Wilhelm Sundberg, Chatham, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/501,383

(22) Filed: Feb. 9, 2000

Related U.S. Application Data

(63) Continuation of application No. 08/834,541, filed on Mar. 18, 1997, now Pat. No. 6,075,813.

(51) Int. Cl.[7] .................................................. H04L 27/04
(52) U.S. Cl. ........................................... 375/216; 375/296
(58) Field of Search ..................................... 375/219, 295, 375/316, 216, 296, 285, 260, 222; 381/2, 3; 455/93; 332/117

(56) References Cited

U.S. PATENT DOCUMENTS

| | | | |
|---|---|---|---|
| 5,278,826 | 1/1994 | Murphy et al. | 370/343 |
| 5,315,583 | 5/1994 | Murphy et al. | 375/260 |
| 5,499,271 | 3/1996 | Plange et al. | 375/295 |
| 5,521,943 * | 5/1996 | Dambacher | 375/296 |
| 5,588,022 | 12/1996 | Dapper et al. | 375/216 |
| 5,745,525 | 4/1998 | Hunsinger et al. | 375/216 |
| 5,757,854 | 5/1998 | Hunsinger et al. | 375/260 |
| 5,850,415 | 12/1998 | Hunsinger et al. | 375/216 |
| 5,903,598 * | 5/1999 | Hunsinger et al. | 370/208 |
| 6,014,407 * | 1/2000 | Hunsinger et al. | 375/296 |

OTHER PUBLICATIONS

"FM-2 System Description," USA Digital Radio, 1990–1995.

N. Jayant, "The AT&T DAR System Update," *NAB 1994 Broadcasting Engineering Conference Proceedings*, pp. 389–398.

J. Bingham, "AT&T/AMATI DAR System: An Update," *NAB 1994 Broadcasting Engineering Conference Proceedings*, pp. 399–403.

* cited by examiner

*Primary Examiner*—Tesfaldet Bocure

(57) ABSTRACT

In a system for simulcasting digitally modulated and analog FM signals over the same FM frequency band, the effect of the analog FM signal on the digitally modulated signal in the simulcast is calculated and canceled from the latter signal before its transmission. As a result, the digital transmission is free from interference from the analog FM signal. Moreover, the digital transmission is achieved by adaptively inserting a time varying number of carriers modulated by digital data into the FM band. The carriers are selected frame by frame to control their interference with the analog FM signal. In accordance with the invention, the carriers are selected in a predetermined order, and in a preferred embodiment grouped contiguously with one another in the FM band. As a result, the rate of control information required to identify the inserted carriers to a receiver is advantageously low.

34 Claims, 4 Drawing Sheets

BAND INSERTION AND PRECANCELLATION TECHNIQUE FOR SIMULTANEOUS COMMUNICATIONS OF ANALOG FREQUENCY-MODULATED AND DIGITALLY MODULATED SIGNALS

This application is a continuation of application Ser. No. 08/834,541, filed on Mar. 18, 1997 issued as U.S. Pat. No. 6,075,813.

FIELD OF THE INVENTION

The invention relates to systems and methods for communications using analog and digitally modulated signals, and more particularly to systems and methods for simulcasting digitally modulated and analog frequency-modulated (FM) signals over an FM frequency band.

BACKGROUND OF THE INVENTION

The explosive growth of digital communications technology has resulted in an ever-increasing demand for bandwidth for communicating digital data. Because of the scarcity of available bandwidth for accommodating additional digital communications, the industry recently turned its focus to the idea of utilizing the preexisting analog FM band more efficiently to help make such an accommodation. However, it is required that any adjustment to the FM band to provide the additional capacity for digital communications does not significantly affect the performance of the analog FM communications.

The above requirement is fully met by using a scheme disclosed in the co-pending, commonly assigned United States patent application of H. C. Papadopoulos and C. W. Sundberg entitled "Technique for Simultaneous Communications of Analog Frequency-Modulated and Digitally Modulated Signals using Precanceling Scheme," Ser. No. 08/704,470, filed Aug. 22, 1996. In accordance with this scheme, digitally modulated carriers are inserted adaptively in the FM band, without causing significant co-channel interference to a host FM signal in a simulcast of the FM signal and carriers. To that end, multiple carrier frequencies (or tones) for digital communications are generated which populate the FM band in a time varying manner. That is, the number of inserted carriers varies with time. The insertion process involves selecting as large a subset of the carrier frequencies as possible during a transmission interval to transmit digital data while the total degradation occasioned thereby to the host analog FM signal is kept at an acceptable level. The effect of precancellation (explained below) of each selected carrier modulated by digital data on the FM signal is taken into consideration.

Specifically, the above insertion process includes a carrier ranking subprocess, which involves an interference assessment in an emulated transmission of the FM signal with each carrier modulated by digital data. The carriers are ranked from the least interfering with the FM signal to the most interfering, and are selected in that order for digital data transmission up to a certain number corresponding to the acceptable limit of degradation to the FM signal. In addition, control information identifying the selected carriers is transmitted to the receiver through a control channel outside the FM band.

However, to ensure the integrity of the transmitted digital data, the interference by the analog FM signal to the digitally modulated carriers needs to be accounted for as well. According to the further aspects of the Papadopoulos and Sundberg scheme, since the waveform of the FM signal is a priori known at the transmitter, such interference can be precanceled by eliminating from the digitally modulated carriers the would-be effect of the FM signal thereon before the simulcast.

SUMMARY OF THE INVENTION

In accordance with the invention, the usefulness of a scheme for simulcasting an FM signal with digitally modulated carriers of the type just described is enhanced by selecting the carriers for insertion in the FM band in a predetermined order. Pursuant to this order, a carrier disposed close to a particular end of the FM band is selected earlier during a transmission interval with respect to a second carrier disposed relatively far from that particular end. With the inventive technique, the carrier ranking subprocess as in the Papadopoulos and Sundberg scheme is advantageously eliminated. In addition, the control information identifying the selected carriers is lessened because of the ordered selection of such carriers, thereby reducing the necessary bandwidth for the control channel.

DETAILED DESCRIPTION

Figure 1:
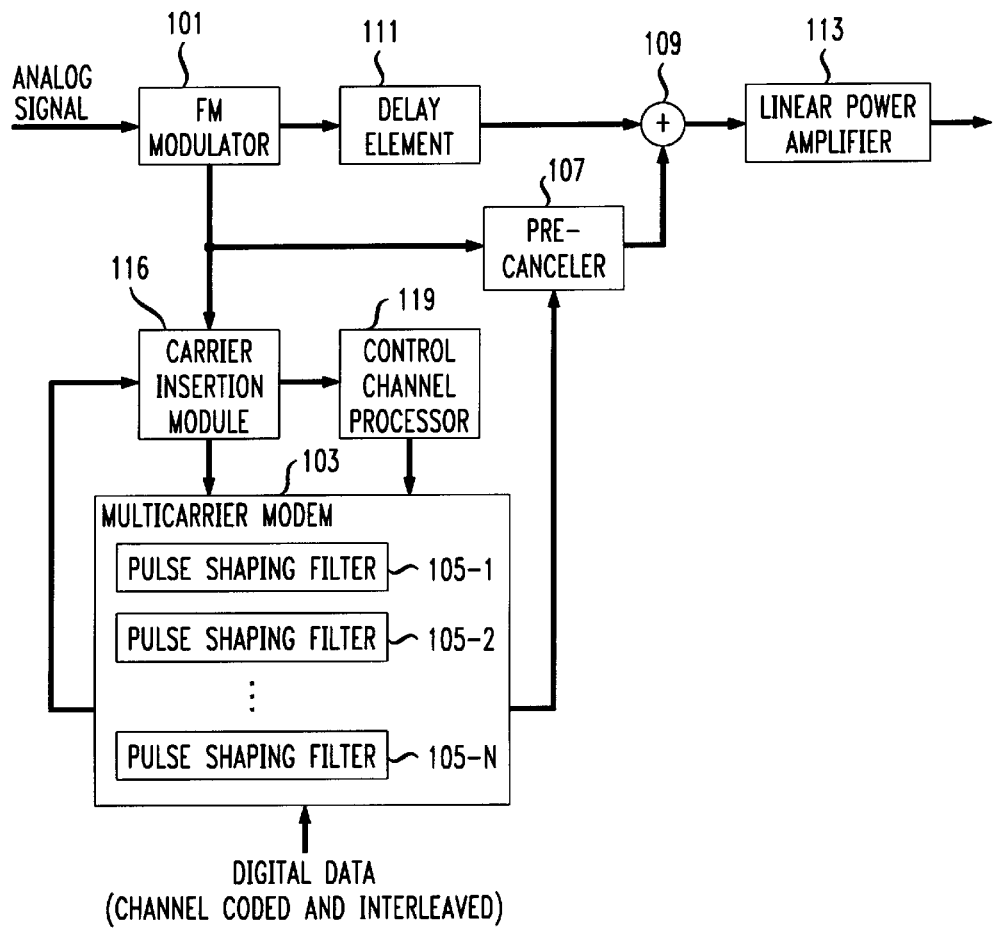
FIG. 1 is a block diagram of a transmitter for transmitting digitally modulated and analog FM signals in accordance with the invention.

FIG. 1 illustrates transmitter 100 for simulcasting digitally modulated signals and analog FM signals in accordance with the invention. FM modulator 101, which may reside in a FM radio station, in a standard way generates a stereo FM signal in response to an analog input signal. The FM signal is to be transmitted over a frequency band, which in this instance is 200 KHz wide, allocated to the FM broadcast. In order to more appreciate the invention, the following provides background information on FM communications:

Analog FM Background

Let m(t) denote an analog modulating signal in FM modulation. The FM carrier $f_c$ after it is modulated by m(t) results in the following FM modulated signal $x_{FM}$:

$$x_{FM}(t) = \cos[\theta(t)],$$

where θ(t) represents the phase angle given by $$\theta(t) = 2\pi f_c t + 2\pi f_d \int_{-\infty}^{t} m(\tau)d\tau,$$

with the assumption that $$\max_t |m(t)| = 1,$$

where $f_d$ represents the maximum frequency deviation.

In the commercial FM setting, $f_d$ is typically 75 KHz, and m(t) is a stereo signal derived from left and right channel information signals represented by L(t) and R(t), respectively. The latter are processed by pre-emphasis filters to form $L_p(t)$ and $R_p(t)$, respectively. The frequency response ($H_p(f)$) of such filters is:

$$H_p(f) = \frac{1 + j(f/f_1)}{1 + j(f/f_2)},$$

where typically $f_1=2.1$ KHz, and $f_2=25$ KHz.

The stereo signal, m(t), is then generated according to the following expression:

$$m(t)=a_1[L_p(t)+R_p(t)]+a_2 \cos(4\pi f_p t)[L_p(t)-R_p(t)]+a_3 \cos(2\pi f_p t),$$

where typically $2f_p=38$ KHz, $a_1=a_2=0.4$, and $a_3=0.1$. The rightmost term, $a_3 \cos(2\pi f_p t)$, in the above expression is referred to as a "Pilot Signal" with carrier frequency $f_p$. It is used by FM receivers to coherently demodulate the passband term involving the difference between the left and right signals.

A conventional FM receiver includes a device for deriving an angle signal from the received version of $X_{FM}(t)$. A mathematical derivative operation of this angle signal provides $\hat{m}(t)$, an estimate of m(t). For monophonic receivers, a lowpass filter is used to obtain an estimate of the $[L_p(t)+R_p(t)]$. Stereo receivers use the pilot signal to demodulate $[L_p(t)-R_p(t)]$, which is then linearly combined with the estimate of $[L_p(t)+R_p(t)]$ to obtain $\hat{L}_p(t)$ and $\hat{R}_p(t)$, the estimates of $L_p(t)$ and $R_p(t)$, respectively. These estimates are then processed by a deemphasis filter having the following frequency response $H_d(f)$ to obtain the estimates of the left and right signals at the transmitter:

$$H_d = \frac{1}{1 + j(f/f_1)}.$$

In accordance with the invention, transmitter 100 is used to transmit a digitally modulated signal representing digital data, together with the host analog FM signal from modulator 101, over the same FM band. One of the objectives of the invention is to allow an FM receiver to process the host analog FM signal in a conventional manner and provide a virtually undeteriorated FM quality, despite the fact that the FM signal shares the same frequency band with the digitally modulated signals.

To that end, the digitally modulated signal is inserted in the host FM band at a low enough power level to avoid causing significant co-channel interference at the FM receiver. Coverage of a digitally modulated signal with low transmission power is normally limited. However, the inventive technique improves such coverage. In addition, the inventive technique includes a precanceling scheme whereby interference which would otherwise be caused by the host analog FM signal to the digitally modulated signal is precanceled.

In accordance with the precanceling scheme, cancellation or elimination of a calculated response of the analog FM signal from the digitally modulated signal is performed at transmitter 100. Since the waveform of the FM signal is a priori known at the transmitter, the precancellation is achievable by eliminating from the digitally modulated signal the would-be effect of the FM signal thereon before the simulcast. Thus, with the precanceling scheme, the digital data transmission, though sharing the same band with the analog FM transmission, is devoid of interference from the analog FM signal at the digital data receiver, subject only to the channel noise.

In transmitter 100, digital data is transmitted pursuant to an adaptive orthogonal frequency division multiplexed scheme. To that end, digital data is input at multicarrier (or multitone) modem 103, which provides multiple carrier frequencies or tones for digital data transmission. The input digital data are channel coded and interleaved in a conventional manner to become more immune to the channel noise.

The digital data transmission by multicarrier modem 103 is achieved using N pulse shaping tones or carriers, each occupying a subband having a bandwidth of 200/N KHz, where N is a predetermined integer having a value greater than 1. Modem 103 includes N pulse shaping filters, denoted 105-1 through 105-N, each associated with a different carrier.

Figure 2:
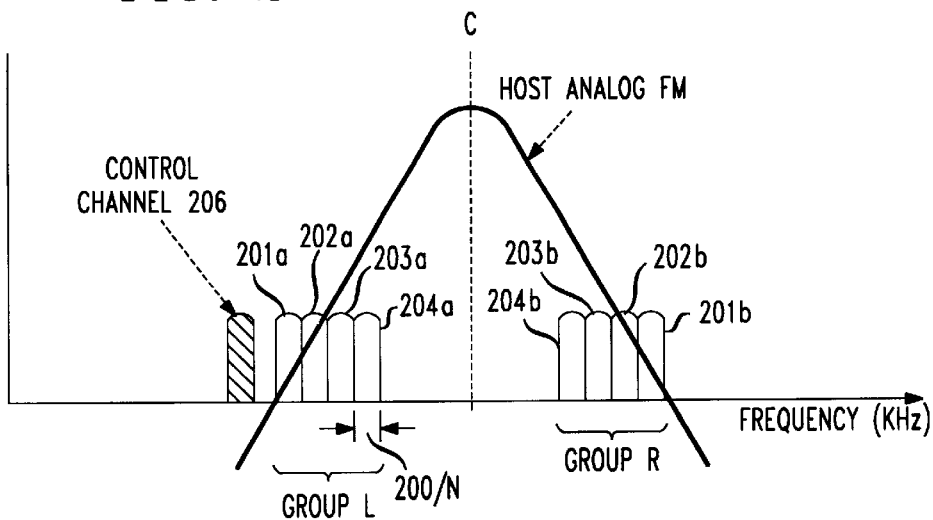
FIG. 2 illustrates a composite power spectrum of carriers modulated by digital data and the analog FM signal during a given time frame in the transmitter of FIG. 1.

The digital data to be transmitted is represented by data symbols. Modem 103 transmits the data symbols on a frame-by-frame basis, with each frame containing M symbols, where M is a predetermined integer having a value greater than 0. Within each frame only a subset of carriers of modem 103 are used for digital data transmission. FIG. 2 shows such a subset populating the FM band during a particular frame. The frequencies and number of carriers in the subset may vary from frame to frame, and are selected in a manner to be described so that the degree of degradation caused by the digital data transmission to the host analog FM signal would be acceptable.

Without loss of generality, let's assume that only the n-th carrier is used in the current frame, which starts at time t=0, and $I_n[0], \ldots, I_n[M-1]$ respectively represent the M symbols allocated to that frame, where $1 \leq n \leq N$. Due to the narrowband nature of the carriers, no equalization is necessary for reliable digital reception in the absence of interference from the analog FM signal. Thus, the corresponding digitally modulated signal to be transmitted on the n-th carrier may be represented by $d_n(t)$ as follows:

$$d_n(t) = \sum_{k=0}^{M-1} I_n[k] h_n(t - kT),$$

where $h_n(t)$ represents the impulse response of pulse shaping filter 105-n associated with the n-th carrier. Assuming perfect time and carrier synchronization, the only significant channel noise being white Gaussian noise, and an absence of inter-symbol interference and other impairments, the digital receiver which is a sampled matched filter with an impulse response $h_n(-t)$ would obtain the following data symbols, represented by $\hat{I}_n(k)$:

$$\hat{I}_n[k] = \int y(t) h_n(t-kT) dt,$$

where $0 \leq k \leq M-1$; y(t) represents the received digitally modulated signal on the FM band. However, the host analog FM signal, represented by $x_{FM}(t)$, is also transmitted on the same band. In a multipath fading channel, the analog signal and the delayed versions thereof would make a non-zero contribution to the received symbols.

In accordance with the inventive technique, precanceler 107 constructs a canceling signal $a_n(t)$ for canceling beforehand all the would-be effects attributed to $x_{FM}(t)$ on $d_n(t)$ such that the digital receiver would in effect receive $d_n(t)$ only. In deriving $a_n(t)$, let's assume the above multipath fading channel has an unknown impulse response g(t). Let the output of the overall system (the channel plus digital receiver) attributed to $a_n(t)$ be denoted $\hat{b}_n[k]$, and the output of same attributed to $x_{FM}(t)$ be denoted $\tilde{c}_n[k]$. Precanceler 107 seeks conditions on $a_n(t)$ such that $$\tilde{c}_n[k]+\hat{b}_n[k]=0, \forall k. \tag{1}$$

Expression (1) represents a zero-forcing condition under which the analog FM signal causes zero interference to the transmission of the digitally modulated signal.

It can be shown that:

$$\tilde{c}_n[k]=\int g(\tau)[\int x_{FM}(u)h_n(u-(kT-\tau))du]d\tau;$$

and $$\hat{b}_n[k]=\int g(\tau)[\int a_n(u)h_n(u-(kT-\tau))du]d\tau.$$

Let's define the following functions $fa_n(\tau)$ and $fx_{FM}(\tau)$ to be the outputs of the matched filter (representing the digital receiver) in response to inputs $a_n(t)$ and $x_{FM}(t)$, respectively:

$$fa_n(\tau)=\int a_n(u)h_n(u-\tau)du;$$

$$fx_{FM}(\tau)=\int x_{FM}(u)h_n(u-\tau)du.$$

The zero forcing condition (1) can then be rewritten as:

$$\int g(\tau)[fa_n(kT-\tau)+fx_{FM}(kT-\tau)]d\tau=0. \tag{2}$$

If expression (2) must hold for any arbitrary $g(\tau)$, then $$fa_n(t)=-fx_{FM}(t), \forall t. \tag{3}$$

That is, the response of the matched filter to the canceling signal $a_n(t)$ must equal the negative of the response to the analog FM signal at all times. It should be noted that precanceler 107 can construct $a_n(t)$ to meet condition (3) based only on the knowledge of $h_n(-t)$ and $x_{FM}(t)$.

Furthermore, condition (3) can be expressed in the frequency domain as follows:

$$A_n(f)H_n(-f)=-x_{FM}(f)H_n(-f),$$

where $A_n(f)$, $Hn(f)$ and $X_{FM}(f)$ are Fourier transforms of $a_n(t)$, $h_n(t)$ and $x_{FM}(t)$, respectively. In other words, in order to satisfy the zero-forcing condition, $A_n(f)$ must equal $X_{FM}(f)$ whenever the frequency response of the matched filter is nonzero.

Since the digitally modulated signal is transmitted by transmitter 100 which also transmits the host analog FM signal $x_{FM}(t)$, using the knowledge of the waveform of the FM signal, precanceler 107 is capable of computing $a_n(t)$ at the cost of a short delay. Using the computed results, precanceler 107 then precancels the effect that the FM signal would otherwise have on the digitally modulated signal when the two signals are simulcast over the same band. The precanceled digitally modulated signal at the output of precanceler 107 is represented by $d_n(t)+a_n(t)$.

The precanceled digitally modulated signal is applied to adder 109 where the precanceled signal is added to a delayed version of the host FM analog signal. The latter comes from the output of delay element 111 which injects into the analog FM signal a delay as long as that incurred by precanceler 107 in computing $a_n(t)$. Similarly, other delays may be introduced into various components of transmitter 100 to better synchronize their operations, and should be apparent to a person skilled in the art implementing the invention as disclosed.

The output of adder 109 can be expressed as $x(t)=x_{FM}(t)+d_n(t)+a_n(t)$. Equivalently, $$x(t)=x_{FM}(t)+\tilde{d}_n(t),$$

where $$\tilde{d}_n(t)=d_n(t)+a_n(t). \tag{4}$$

In general, a subset S of the N carriers in multicarrier modem 103 is selected. In that case the output of adder 109 (x(t)) can be generically represented as follows:

$$x(t)=x_{FM}(t)+d(t),$$

where d(t) represents the aggregate digitally modulated signal and can be expressed as follows:

$$d(t) = \sum_{n \in S} \tilde{d}_n(t),$$

where $\tilde{d}_n(t)$ is given by expression (4) above for each value of n.

The output of adder 109 is applied to linear power amplifier 113 of conventional design. The latter transmits an amplified version of the composite signal x(t) over the allocated FM frequency band.

The manner in which the subset S of the N carriers in modem 103 is selected for digital data transmission will now be described. The precanceling scheme described above guarantees that the digital data is transmitted without interference from the host analog FM signal. However, the host analog FM signal may be significantly affected by the digitally modulated signal using such a scheme. Thus, one of the objectives of the invention is to select as large a subset (S) of the carriers as possible while the total degradation incurred to the host analog FM signal is kept at an acceptable level.

One way to evaluate this degradation is by simulating an analog FM receiver. Let $\hat{L}(t)$ and $\hat{R}(t)$ respectively denote the left and right channel estimates of the analog FM receiver subject to an input $x(t)=x_{FM}(t)+d(t)$. Given the values of L(t) and R(t) which are available at transmitter 100, $\hat{L}(t)$ and $\hat{R}(t)$ can be predetermined whether they are of acceptable quality. By way of example, but not limitation, the figure of merit ($\gamma$) used in this particular embodiment is defined as follows:

$$\gamma = \frac{\int_{time-frame}[L(t)-\hat{L}(t)]^2 dt + \int_{time-frame}[R(t)-\hat{R}(t)]^2 dt}{\int_{time-frame}L^2(t)dt + \int_{time-frame}R^2(t)dt}.$$

The subset (S) of carriers are selected by carrier insertion module 116 on a time-frame by time-frame basis. Module 116 runs an insertion algorithm to turn on as many carriers as possible during each frame, subject to a preselected constraint, $\gamma_{max}$, representing the maximum acceptable degradation to the host analog FM signal.

Unlike the Papadopoulos and Sundberg carrier insertion process described above, the instant insertion process (numerically denoted 300) to be described does not involve any carrier ranking subprocess, and thus is much simpler. As a result, insertion process 300 is much shorter and accordingly runs faster. Referring to FIG. 2, in accordance with process 300 module 116 selects the carriers in a predetermined order. In particular, they are selected in pairs. As shown in FIG. 2, carriers 201a and 201b, carriers 202a and 202b, carriers 203a and 203b, and carriers 204a and 204b are four such pairs. The members of each pair are separated and disposed symmetrically about center line C of the FM band. In addition, the members of each pair are contiguous to the respective ones of the other pairs. That is, carriers 201a, 202a, 203a and 204a are disposed contiguously to one another and form group L while carriers 201b, 202b, 203b and 204b are disposed contiguously to one another and from group R. The order in which the pairs are selected for insertion is from the outermost pair of carriers close to the respective ends of the FM band to the innermost allowed pair of carriers close to center line C. That is, the first pair selected for insertion in this instance is pair 201a and 201b which are the outermost pair, presumably the least disturbing to the FM signal, followed by inner pairs—202a and 202b pair, 203a and 203b pair, and so on and so forth up to a limit in that order. Since each carrier occupies a subband of 200/N KHz, the maximum number of pairs to be selected (or number of members in group L or R) is N/2 if N is an even number, or (N−1)/2 if N is an odd number. However, the actual number of pairs selected for insertion is determined by carrier insertion process 300.

Figure 3:
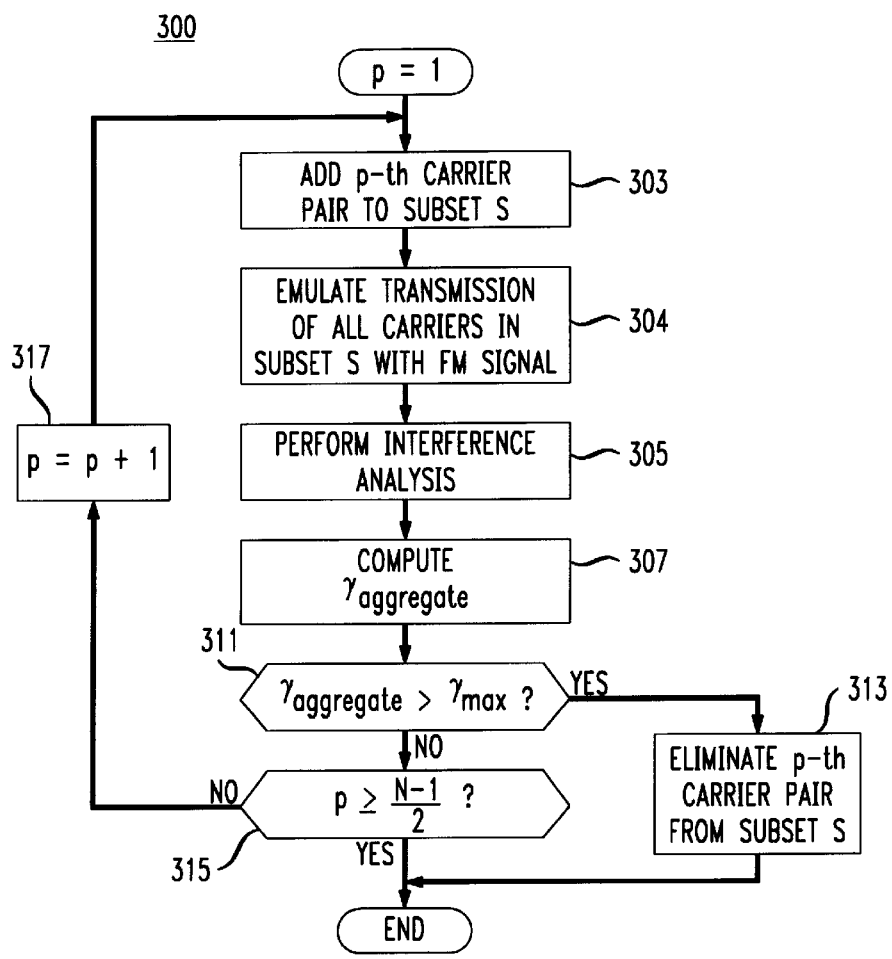
FIG. 3 is a flow chart depicting the steps of selecting the carriers for digital transmission in the transmitter of FIG. 1.

FIG. 3 is a flow chart depicting the steps of carrier insertion process 300 run by module 116 in accordance with the invention. For each time frame, p-th pair of carriers is added to the subset S of carriers, as indicated at step 303, where p=1 initially (i.e., in the first run, the subset S consists of the outermost pair of carriers 201a and 201b only). Transmission of all carriers in the subset S together with the host analog FM signal is then emulated at step 304. In this particular embodiment, the carriers contain random digital data in the emulated transmission. However, in an alternative embodiment, the carriers may contain the actual digital data to be transmitted in the emulation. In that embodiment, although the emulation would be more realistic, the bookkeeping of each carrier for the associated data used in the emulation is necessary. At step 305, module 116 performs an interference analysis of the emulated transmission, taking into account the precancellation effect of the subset of carriers on the FM signal. Based on the interference analysis, module 116 at step 307 computes the value of $\gamma_{aggregate}$ indicative of the aggregate degradation caused by the subset of carriers to the FM signal. At step 311, module 116 determines whether the value of $\gamma_{aggregate}$ exceeds that of $\gamma_{max}$. If $\gamma_{aggregate} > \gamma_{max}$, i.e., the aggregate degradation is greater than the maximum acceptable degradation, which is not allowed, process 300 is coming to an end. Specifically, before the process ends, the p-th carrier pair just added to the subset S is eliminated therefrom, as indicated at step 313.

Otherwise if $\gamma_{aggregate} \leq \gamma_{max}$, module 116 determines at step 315 whether the last carrier pair has been added to the subset (i.e., p≥(N−1)/2). If p≥(N−1)/2, process 300 again comes to an end. Otherwise, module 116 selects the next contiguous, inner carrier pair (i.e., p=p+1) at step 317, and returns to step 303 previously described.

Since the carrier pairs selected by carrier insertion module 116 may vary from frame to frame, a control channel is required to convey information identifying the selected pairs to the receiver described hereinbelow. Specifically, the receiver needs to be informed of which carrier pairs are used during each frame. Control channel processor 119 is employed to generate data bits representing such control information, and causes the generated bits to be transmitted over control channel 206 in FIG. 2, which is reserved outside the analog signal spectrum.

It should be noted at this point that due to the above ordered selection of carrier pairs in accordance with the invention, the data rate required to convey the control information is advantageously much lower (and thus less control channel bandwidth is needed) than that in the Papadopoulos and Sundberg scheme described above. In the latter scheme, N bits per frame are required to identify the on-off states of N carriers which may possibly be used.

By contrast, in the present scheme the control information is needed to identify to the receiver only the innermost carrier pair that is used. From that information, the receiver readily derives all the carriers that were used in transmitter 100. In an example where N=40, since the innermost pair could be one of 20 possible pairs altogether, it needs 5 bits (versus 40 bits in the Papadopoulos and Sundberg scheme) per frame to convey the control information if the transmission thereof has to be complete within one time frame. If the control information is allowed to be sent over a large number of time frames, it can be shown that the average bit rate approaches 4.39 bits per frame. This bit rate can further be reduced if differential coding is applied to the control information, taking advantage of the tendency that the carriers used in one frame are likely to be used in the next frame.

Figure 4:
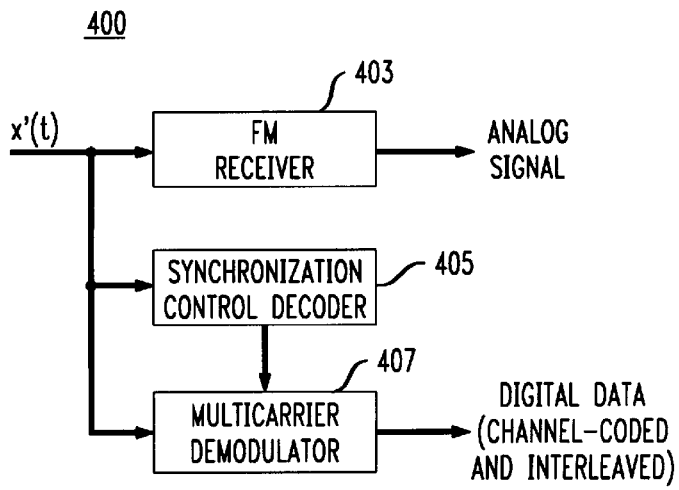
FIG. 4 is a block diagram of a receiver for receiving the digitally modulated and analog FM signals from the transmitter of FIG. 1.

FIG. 4 illustrates receiver 400 for receiving from the FM frequency band a composite signal x'(t) corresponding to x(t) and the control channel information generated at transmitter 100. Because of the precancellation performed at the transmitter, the design of receiver 400 is advantageously simple. As mentioned before, FM receiver 403 in receiver 400 is of conventional design and, in a standard way recovers the original analog signal. Synchronization control decoder 405 decodes the control channel information in x'(t) identifying the inner most carrier pair which was used for digital transmission in each transmission interval. Because of the above ordered selection of the carriers in accordance with the invention, decoder 405 readily derives from that information the identities of all the carriers that were used in transmitter 100, and such identities are then conveyed to demodulator 407. In response, demodulator 407 performs the inverse function to modulator 103 on x'(t) to recover therefrom the digital data, albeit channel-coded and interleaved.

The foregoing merely illustrates the principles of the invention. It will thus be appreciated that those skilled in the art will be able to devise numerous other schemes which embody the principles of the invention and are thus within its spirit and scope.

For example, in the disclosed embodiment the frequency carriers are selected by carrier insertion module 116 for insertion into the FM band on a pair by pair basis. However, the invention broadly applies to other insertion schemes such as one in which the carriers are selected one at a time in a sequential order from the outermost carrier in the FM band to one or more inner carriers contiguous to one another. Another insertion scheme may require that the carriers are selected one at a time from group L and group R alternately. The last scheme may also be combined with disclosed insertion process 300 to yield a hybrid insertion process.

Figure 5:
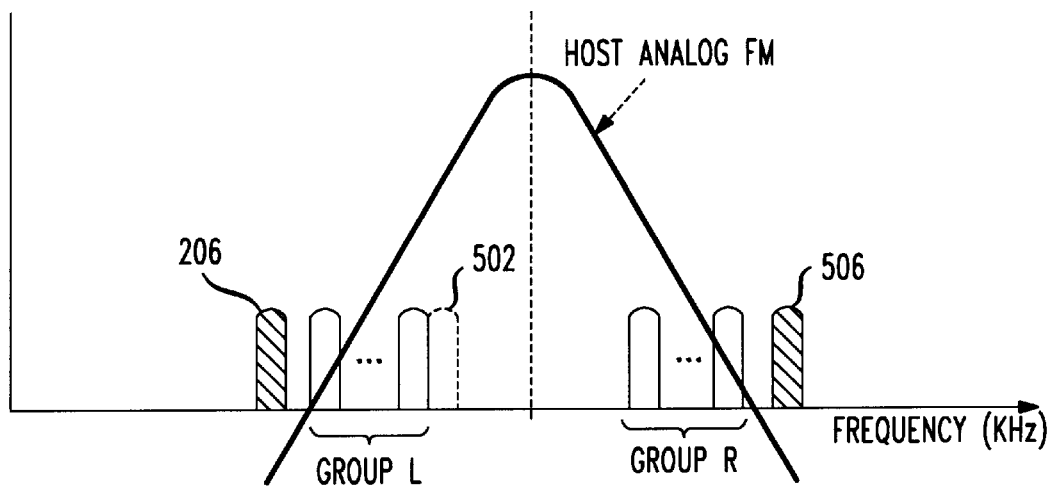
FIG. 5 illustrates a composite power spectrum of the analog FM signal and selected carriers in accordance with an inventive hybrid carrier insertion scheme.

Referring to FIG. 5, in accordance with this hybrid insertion process, after disclosed process 300 has been applied to insert as many pairs of carriers as possible in the FM band, a single carrier 502 contiguous to group L (group R) is inserted into the FM band to test the acceptable degradation limit. If the insertion does not violate the limit, carrier 502 is adopted and the hybrid process ends there. Otherwise, carrier 502 is similarly inserted contiguously to group R (group L) to test the acceptable degradation limit. If such an insertion does not violate the limit, carrier 502 is adopted. In any event, the hybrid process ends thereafter.

Moreover, in the disclosed embodiment, control information identifying the inserted carriers is transmitted to the receiver over a discrete control channel, i.e., control channel 206. It will be appreciated that a person skilled in the art will device other schemes for communicating such control information to the receiver which, for example, may involve multiple channels. In addition, protective measures may be taken to secure the communication of the control information. For example, in accordance with a frequency diversity approach, an additional control channel such as control channel 506 in FIG. 5, located at a different frequency than control channel 206, may be utilized to transmit the same control information as channel 206, for fear that one of the control channels may be adversely affected at times.

Figure 6:
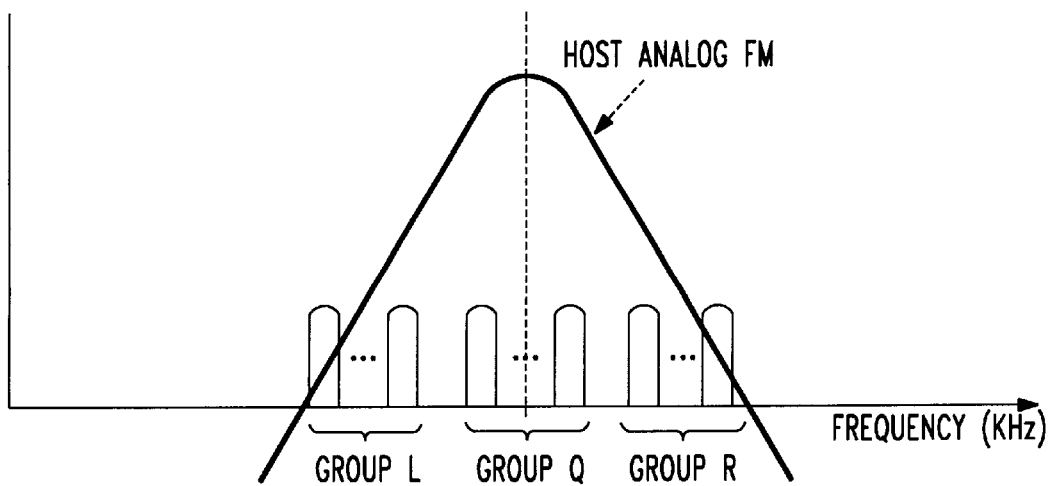
FIG. 6 illustrates a composite power spectrum of the analog FM signal, and multiple groups of selected carriers for digital transmission in accordance with the invention.

Furthermore, in the disclosed embodiment, the carriers are selected from two groups, namely, group R and group L. It will be appreciated that a person skilled in the art will select carriers from more than two groups such as groups R, L and Q as shown in FIG. 6. Alternatively, the carriers may also be selected from only one of those groups.

In addition, it will be appreciated that a person skilled in the art will apply the inventive band insertion and precancellation technique with a variety of standard digital modulation techniques including, for example, MPSK and MQAM techniques.

Figure 7A:
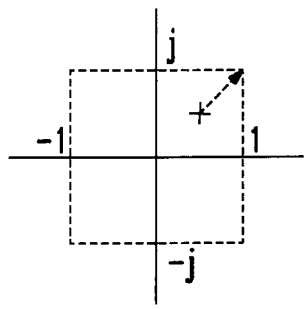
FIGS. 7A–7C respectively depict three possible scenarios where a precancellation scheme in accordance with the invention may or may not be needed.
Figure 7B:
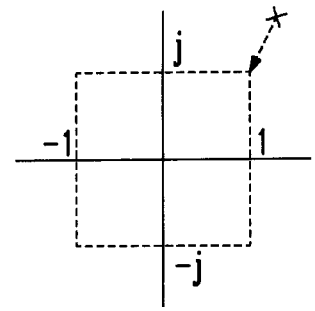
Figure 7C:
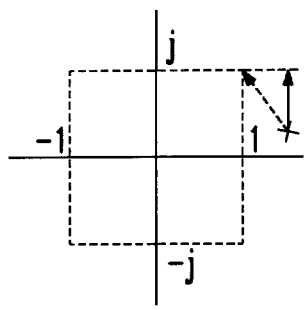

Moreover, the inventive band insertion and precancellation technique may be selectively applied. In certain situations, precancellation may not be necessary. One such situation will now be demonstrated where a well-known QPSK constellation is used for generating data symbols. FIGS. 7A through 7C respectively show three possible scenarios where we assume that the symbol transmitted was at 1+j.

In the scenario of FIG. 7A, without precancellation, the received symbol in the absence of noise is indicated by "x" inside the square whose corners are marked by the four possible symbols. Since the received symbol is closer to the decision boundaries than 1+j which is the intended symbol, the effective SNR of this received symbol has been lowered. Precancellation in this case effectively moves the symbol in the direction of the dashed arrow to the position 1+j to regain the desired SNR.

In the scenario of FIG. 7B, however, the effective SNR of the received symbol without precanceling is higher than that of 1+j. Since precancellation would reduce the SNR of the received symbol, and possibly introduce additional distortion to the host FM signal, we may want to refrain from applying precancellation in this case.

In the scenario of FIG. 7C, even though precancellation is necessary in this case, the precancellation described above moves the received symbol in the direction of the dashed arrow to the position of 1+j. However, such precancellation is inferior to the one that, for example, moves the received symbol in the direction of the solid arrow shown in FIG. 7C. The precancellation represented by the solid arrow further improves the SNR of the symbol, and possibly the host FM signal distortion.

Figure 8A:
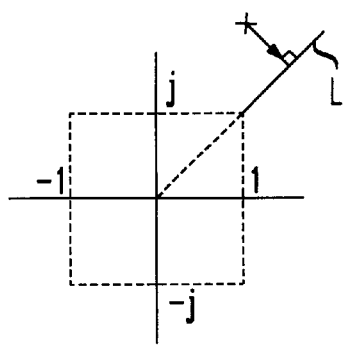
FIGS. 8A and 8B respectively depict two possible scenarios where an improved precancellation scheme in accordance with the invention is applicable.
Figure 8B:
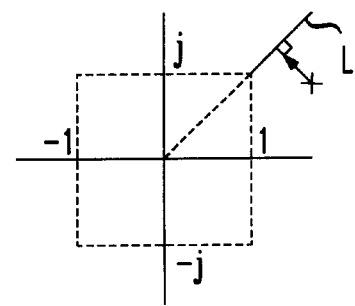

Based on the above observation and the disclosure heretofore, it will be appreciated that a person skilled in the art will devise other precanceling schemes which may be more immune to carrier recovery errors than the present scheme. For example, an improved precanceling scheme is depicted here in FIGS. 8A and 8B applying to the scenarios of FIGS. 7B and 7C, respectively. As shown in FIGS. 8A and 8B, the improved precancellation moves the received symbol "x" in the direction of the solid arrow perpendicularly to a solid line denoted L. Line L is an extension of the dashed line emanating from the origin of the constellation, and extends outwardly from the point 1+j. Lines involving other symbols in the constellation can be formed in a similar manner. However, the received symbol is translated onto the closest line (which is L in this instance) in shortest Euclidean distance (i.e., perpendicularly to the line). To minimize intersymbol interference in case of incorrect sampling instants, we may limit the amplitude of the translated symbol by limiting the length of line L. It should be noted that this improved precanceling scheme is applicable to digital transmission not only involving QPSK, but also other constellations, such as MPSK, MQAM, PAM, and multidimensional constellations. In the case of MPSK, the improved precanceling scheme can be applied to all signal points therein, while in the case of MQAM, the improved precanceling scheme should be selectively applied to the outer signal points therein.

In addition, although in the disclosed embodiment, a particular digitally modulated signal which is linearly modulated is simulcast with an analog FM signal which is non-linearly modulated, the invention broadly applies to a simulcast of a linearly modulated signal with another linearly or non-linearly modulated signal.

Finally, the band insertion and precancellation technique described herein may be used in combination with other techniques such as the postcanceling technique disclosed in the co-pending, commonly assigned U.S. patent application Ser. No. 08/748,043, filed on Nov. 12, 1996, entitled "Technique for Simultaneous Communications of Analog Frequency-modulated and Digitally Modulated Signals using Postcanceling Scheme."

We claim:

1. Apparatus for communicating over a frequency band first information and second information during an interval, said first information being represented by a signal occupying said frequency band, comprising
   a controller for selecting a plurality of carriers within the frequency band in a predetermined order, a carrier disposed relatively close to a particular end of the frequency band being selected earlier during said interval with respect to a second carrier disposed relatively far from said particular end, said plurality of carriers being modified based on said second information;
   a processor responsive to the signal for adjusting the modified carriers; and
   an output device for populating the adjusted carriers on said frequency band occupied by the signal in accordance with the predetermined order.

2. The apparatus of claim 1 wherein said first information includes analog information and second information includes digital data.

3. The apparatus of claim 1 wherein said signal includes a frequency-modulated (FM) signal.

4. The apparatus of claim 1 wherein said frequency band is allocated for transmission of FM signals.

5. The apparatus of claim 1 further comprising a multi-carrier modem for generating said plurality of carriers.

6. The apparatus of claim 1 wherein at least one selected carrier is disposed contiguously to another selected carrier in the frequency band.

7. The apparatus of claim 1 wherein said controller includes said processor.

8. Apparatus for communicating over a frequency band first information and second information during an interval, said frequency band having a first end and a second end, said first information being represented by a signal occupying said frequency band, comprising:

a controller for selecting, in a predetermined order, a plurality of carriers within the frequency band to become members of at least one carrier group, one of said at least one carrier group being disposed closer to the first end than the second end of the frequency band, a first carrier in said one of said at least one carrier group being disposed closer to the first end of the frequency band than a second carrier therein, said first carrier being selected earlier than said second carrier to become a member in said one of said at least one carrier group during said interval in accordance with said predetermined order, the plurality of carriers being modified based on said second information;

a processor responsive to the signal for adjusting the modified carriers; and an output device for populating the adjusted carriers on said frequency band occupied by the signal in accordance with the predetermined order.

9. The apparatus of claim 8 wherein said first information includes analog information and second information includes digital data.

10. The apparatus of claim 8 wherein said first signal includes an FM signal.

11. The apparatus of claim 8 wherein said frequency band is allocated for transmission of FM signals.

12. The apparatus of claim 8 further comprising a multi-carrier modem for generating said plurality of carriers.

13. The apparatus of claim 8 wherein said at least one carrier group comprises a first carrier group and a second carrier group.

14. The apparatus of claim 13 wherein said first carrier group is said one of said at: least one carrier group disposed closer to the first end than the second end of the frequency band, and said second carrier group is disposed closer to the second end than the first end of the frequency band.

15. The apparatus of claim 14 wherein carriers in said second carrier group are selected in accordance with said predetermined order, each carrier in said first carrier group being associated with a respective one of the carriers in said second carrier group.

16. The apparatus of claim 15 wherein each carrier in said first carrier group and the associated carrier in said second carrier group are selected simultaneously.

17. The apparatus of claim 13 wherein at least one selected carrier in said first carrier group is disposed contiguously to another selected carrier in the frequency band.

18. The apparatus of claim 13 wherein at least one selected carrier in said second carrier group is disposed contiguously to another selected carrier in the frequency band.

19. The apparatus of claim 8 wherein said controller includes said processor.

20. A method for communicating over a frequency band first information and second information during an interval, said first information being represented by a signal occupying said frequency band, comprising:

selecting a plurality of carriers within the frequency band in a predetermined order, a carrier disposed relatively close to a particular end of the frequency band being selected earlier during said interval with respect to a second carrier disposed relatively far from said particular end, said plurality of carriers being modified based on said second information;

adjusting the modified carriers in response to the signal; and populating the adjusted carriers on said frequency band occupied by the signal in accordance with the predetermined order.

21. The method of claim 20 wherein said first information includes analog information and second information includes digital data.

22. The method of claim 20 wherein said signal includes an FM signal.

23. The method of claim 20 wherein said frequency band is allocated for transmission of FM signals.

24. The method of claim 20 wherein at least one selected carrier is disposed contiguously to another selected carrier in the frequency band.

25. A method for communicating over a frequency band first information and second information during an interval, said frequency band having a first end and a second end, said first information being represented by a signal occupying said frequency band, comprising:

selecting, in a predetermined order, a plurality of carriers within the frequency band to become members of at least one carrier group, one of said at least one carrier group being disposed closer to the first end than the second end of the frequency band, a first carrier in said one of said at least one carrier group being disposed closer to the first end of the frequency band than a second carrier therein, said first carrier being selected earlier than said second carrier to become a member in said one of said at least one carrier group during said interval in accordance with said predetermined order, the plurality of carriers being modified based on said second information;

adjusting the modified carriers in response to the signal; and populating the adjusted carriers on said frequency band occupied by the signal in accordance with the predetermined order.

26. The method of claim 25 wherein said first information includes analog information and second information includes digital data.

27. The method of claim 25 wherein said first signal includes an FM signal.

28. The method of claim 25 wherein said frequency band is allocated for transmission of FM signals.

29. The method of claim 25 wherein said at least one carrier group comprises a first carrier group and a second carrier group.

30. The method of claim 29 wherein said first carrier group is said one of said at least one carrier group disposed closer to the first end than the second end of the frequency band, and said second carrier group is disposed closer to the second end than the first end of the frequency band.

31. The method of claim 30 wherein carriers in said second carrier group are selected in accordance with said predetermined order, each carrier in said first carrier group being associated with a respective one of the carriers in said second carrier group.

32. The method of claim 31 wherein each carrier in said first carrier group and the associated carrier in said second carrier group are selected simultaneously.

33. The method of claim 29 wherein at least one selected carrier in said first carrier group is disposed contiguously to another selected carrier in the frequency band.

34. The method of claim 29 wherein at least one selected carrier in said second carrier group is disposed contiguously to another selected carrier in the frequency band.

* * * * *